United States Patent [19]
Everts

[11] Patent Number: 4,463,498
[45] Date of Patent: Aug. 7, 1984

[54] COUPLING FOR FLAILING LINE TRIMMER HANDLES

[76] Inventor: Robert G. Everts, 2050 N. 90th Pl., Chandler, Ariz. 85224

[21] Appl. No.: 413,521

[22] Filed: Aug. 31, 1982

[51] Int. Cl.³ .............................................. A01G 3/06
[52] U.S. Cl. .................................... 30/296 R; 56/17.1
[58] Field of Search ............. 30/296 R, 276; 56/17.1; 16/11 A; 403/359, 373

[56] References Cited

U.S. PATENT DOCUMENTS

| | | | |
|---|---|---|---|
| 3,330,102 | 7/1967 | Shuman | 56/17.1 X |
| 3,803,819 | 4/1974 | Ehrlich | 56/17.1 |
| 4,023,332 | 5/1977 | Achenbach | 56/17.1 |
| 4,043,101 | 8/1977 | Lahr | 56/17.1 |
| 4,122,601 | 10/1978 | Katsuya | 30/296 A |
| 4,364,435 | 12/1982 | Tuggle | 30/296 R |

*Primary Examiner*—Jimmy C. Peters
*Attorney, Agent, or Firm*—Warren F. B. Lindsley

[57] ABSTRACT

A coupling for the handle shaft of a flailing line type trimmer which permits angular adjustment of a drive head. The coupling clamps two parts of the handle shaft together. The coupling prevents rotation of one part and permits the selectible rotation of the other. It is preferably formed as a split clamp joining and securely holding the parts in abutment. A pin on the split clamp engages a recess in the end of one handle shaft part to prevent its rotation while a lip on the split clamp engages a circumferential groove in the other handle shaft part to enable it to rotate. A releasable fastener permits loosening of the clamp to allow rotational adjustment of the parts, and their retention at a selected orientation.

9 Claims, 5 Drawing Figures

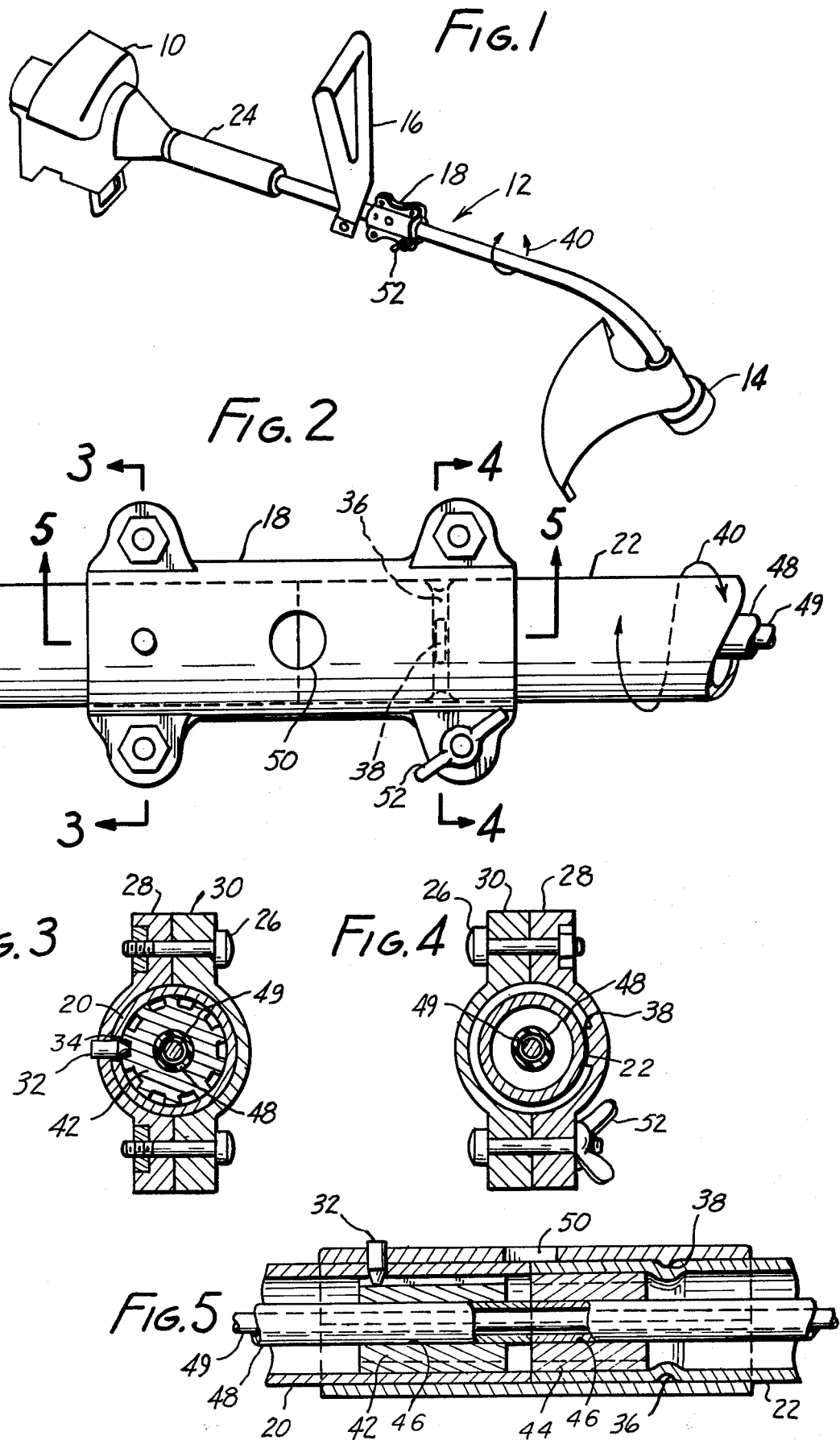

COUPLING FOR FLAILING LINE TRIMMER HANDLES

FIELD OF THE INVENTION

This invention relates to trimmers of the flailing line type, and more particularly relates to a handle joint that enables the cutting angle of the trimmer conveniently to be adjusted.

BACKGROUND OF THE INVENTION

Weed and grass trimmers using a flailing line for cutting purposes are widely used for many different kinds of trimming, such as around obstacles and edging, where the plane occupied by the rotating flail is differently oriented, sometimes horizontally, sometimes vertically, and sometimes in between these two positions.

One conventional trimmer is comprised of an engine or motor mounted on the outboard end of a handle shaft, and a drive head at the other end of the shaft. The flailing line is driven by a cable that passes through the handle shaft from the motor to the drive head. A grip on the handle shaft and an outwardly extending handle permit the operator to manuever the plane of the rotating cutting line by tilting the drive head at whatever angle is necessary. In other conventional devices, both the motor and the drive head are located at the distal end of the handle shaft.

A difficulty in the use of such trimmers is that the weight of the engine makes maneuvering and tilting at various angles tiring particularly when the engine and the drive head are at opposite ends of the device. The engine is usually mounted and balanced for use in one position relative to the handle, and a positive torque must be applied to tilt the assembly. Also, when an internal combustion engine is used, it may not operate properly if tilted at excessively steep angles. The tilting can affect the flow of fuel which will disturb engine operation or even cause it to stop. It is advantageous for the internal combustion engine to remain in one suitable orientation when the drive head is tilted at various angles relative to the engine to tilt the cutting line. This also reduces operator fatigue. When the motor is carried on the head (then it is usually an electric motor), it is still useful to be able to change the head orientation relative to the handle so the user can have the most effort-free grip on the assembly.

Therefore it is one object of the present invention to provide a trimmer with a drive head that is tiltably adjustable relative to a handle, and optionally also relative to an engine or motor on the handle end.

Another object of the invention is to provide a trimmer having a two-part handle shaft, with one part being rotatable relative to the other, and the other part fixed relative to a handle.

BRIEF DESCRIPTION OF THE INVENTION

A tiltably adjustable head is provided by coupling a hollow handle shaft of a flailing line type trimmer by joining two parts. One part carries a grip, and might also carry an engine. The other part supports a drive head for spinning the cutting line, and in some devices, might also support a motor to turn the drive head. A coupling joins and secures the two parts of the handle shaft, and allows one part to be rotatably adjusted relative to the other part.

The coupling is provided in the form of a split clamp fitting around and securely clamping the abutting ends of the two parts of the handle shaft. One part of the handle shaft has a circumferential groove which is engaged by a lip on the inside surface of one of the clamp halves. The clamp can be loosened to allow for rotation without axial removal. The other part of the handle shaft has a recess or a hole engaged by a pin on one of the clamp halves that prevents any rotation. The lip and the pin prevent separation of their respective part.

A sight port can optionally be provided so the user can be certain that the clamp is properly located.

The above and other features of the invention will be fully understood from the following detailed description and the accompanying drawings, in which:

BRIEF DESCRIPTION OF THE DRAWINGS

FIG. 1 is a perspective view of a trimmer having a tiltably adjustable drive head according to the invention;

FIG. 2 is an enlarged partial section;

FIG. 3 is a sectional view taken at line 3—3 in FIG. 2;

FIG. 4 is a sectional view taken at line 4—4 in FIG. 2; and

FIG. 5 is a sectional view taken at line 5—5 in FIG. 2.

DETAILED DESCRIPTION OF THE INVENTION

The invention is best adapted for use on line trimmers of the type shown generally in FIG. 1. The line trimmer flails a line in a circular path to trim grass and weeds. In the illustrated embodiment it is comprised of an engine 10 mounted on the proximal end of a hollow handle shaft 12 through which a cable 49 (FIG. 2) passes to drive head 14. Handle 16 permits manuevering of the drive head and flailing line.

The present invention permits easy adjustment of the angle of the drive head for trimming around variously-oriented obstructions. This is accomplished by providing a hollow handle shaft in two parts, with one part being rotatable relative to the other part as shown in FIGS. 2 through 5. These parts are joined and secured by a releasable coupling 18 which will be described in greater detail hereinafter.

The hollow handle shaft has a first part 20 and a second part 22. Handle shaft part 20 is joined to a hand grip 24 (FIG. 1) extending outwardly from the engine. Handle shaft part 22 is joined to drive head 14 at one end and is rotatably joined and secured in abutment with handle shaft part 20 by releasable coupling 18.

Coupling 18 includes a split clamp secured around the abutting ends of the two handle parts by means of fasteners passing through mating flanges 28 and 30 on each end and opposite sides of the split clamp. Pin 32 mates with recess 34 in the end of handle shaft part 20 to prevent rotation of part 20 relative to the clamp, and therefore relative to part 22. It also prevents axial separation of part 20 from the clamp when the clamp is tightened.

Handle shaft part 22 has a circumferential groove 36 near its abutting end. Lip 38 on the inside surface of coupling 28 engages in circumferential groove 36. Lip 38 allows handle shaft part 22 to rotate relative to the clamp, and therefore relative to part 20 as shown by arrow 40, but prevents separation of part 20 from coupling 18. Part 20 can be the "upper" part, and part 22 could be the "lower" part, or vice versa.

Solid cylindrical inserts 42,44 snugly fit in the hollow ends of the handle shafts inside the coupling 18 to reinforce the shaft and resist compressive deformation when the clamp is tightened. Holes 46 through inserts 42,44 permit passage of a cable guide tube 48 which journals a cable 49 that extends from engine 10 to drive head 14. Cable 49 is kept in central alignment by tube 48. Tube 48 is not needed in the types of weed trimmers where the motor is at the distal end, and there is no cable to support and center. However, the insert will be provided so the clamp cannot crush the parts.

In use, handle shaft part 22 is fitted in the coupling until it abuts the end of handle shaft part 20 as viewed through port 50 provided in the coupling. This also aligns lip 38 with groove 36 in handle shaft part 22. Pin 32 will be fitted into recess 34 in handle shaft part 20 before inserting handle shaft part 22. Their correct abutment can be assured by looking through the hole. The fasteners are then tightened down securely jointing and clamping the two handle shaft part together.

Conveniently, the fasteners are bolt/nut combinations, with at least one of them adjacent to the groove being a wing nut 52 so it can readily be loosened and tightened. The wing nut will be tightened to fix the position of the drive head. Angular adjustment eliminates the difficult and tiring task of tilting and holding the drive head in opposition to a torque exerted by the cutting head or by the drive head.

Thus there has been described a releasable coupling device for a trimmer of the flailing line type which permits easy adjustment of the drive head tilt angle.

This invention is not to be limited by the embodiment shown in the drawings and described in the description, which is given by way of example and not of limitation, but only in accordance with the scope of the appended claims.

I claim:

1. In a trimmer of the flailing line type having a handle, a handle shaft, a drive head at the distal end of said handle shaft, an engine, and means operatively joining said engine to said drive head, the improvement comprising:
    releasable clamp means joining said handle to said drive head whereby said drive head may be rotated and held at a predetermined tilt angle with respect to said handle,
    said clamp means comprising a first handle shaft part and a second handle shaft part,
    said drive head being attached to the end of one of said handle shaft parts,
    releasable coupling means for coupling said first and second handle shaft parts,
    said coupling means comprising a split clamp surrounding and securely clamping the ends of said first and second handle shaft parts in abutment with each other,
    one of said handle shaft parts having a circumferential groove on its end positioned within said coupling means, and
    said split clamp having a lip on its inside surface in engagement with said groove whereby said one of said handle shaft parts may rotate within said clamp independently of the other and be restrained against axial removal.

2. A trimmer according to claim 1 including stop means for restraining said other handle shaft part against rotation relative to said clamp, and against axial removal therefrom.

3. A trimmer according to claim 2 in which said stop means comprises a recess near the end of said other handle shaft part; and a pin on said split clamp adapted to engage in said recess.

4. A trimmer according to claim 1 including releasable fastener means for releasing the clamping force of said split clamp for adjusting and resetting said drive head in an adjusted tilt position.

5. A trimmer according to claim 4 in which said releasable fastener means comprises a wing nut adapted to be loosened and tightened against said clamp and thereby against said handle shaft part which has said circumferential groove.

6. A trimmer according to claim 1 in which said engine is mounted on the outboard end of the handle of said trimmer, said means operatively joining said engine to said drive head comprising a cable passing through said first and second handle shaft parts.

7. A trimmer according to claim 1 in which said coupling means includes a port for viewing the location of the abutting ends of said first and second handle shaft part in said coupling means.

8. A trimmer according to claim 6 in which rigid inserts are fitted into hollow abutting ends of said handle shaft parts to resist compressive deformation by said coupling means.

9. A trimmer according to claim 8 in which a bearing is placed inside each of said inserts to journal said cable.

* * * * *